United States Patent [19]

Mani

[11] Patent Number: 4,995,956
[45] Date of Patent: Feb. 26, 1991

[54] METHOD AND APPARATUS TO CONTROL A SALT STREAM TO BE TREATED IN AN ELECTRODIALYTIC WATER SPLITTER

[75] Inventor: Krishnamurthy N. Mani, Basking Ridge, N.J.

[73] Assignee: Allied-Signal Inc., Morris Township, Morris County, N.J.

[21] Appl. No.: 335,171

[22] Filed: Apr. 6, 1989

[51] Int. Cl.⁵ .................................... B01D 13/02
[52] U.S. Cl. ......................... 204/182.4; 204/182.5; 204/151; 204/301
[58] Field of Search .............. 204/151, 182.4, 182.5, 204/301

[56] References Cited

U.S. PATENT DOCUMENTS

| | | | |
|---|---|---|---|
| 4,082,835 | 4/1978 | Chlanda et al. | 423/242 |
| 4,107,015 | 8/1978 | Chlanda et al. | 204/180 |
| 4,253,928 | 3/1981 | Blytas et al. | 204/151 |
| 4,738,764 | 4/1988 | Chlanda et al. | 204/296 |
| 4,740,281 | 4/1988 | Chlanda et al. | 204/151 |
| 4,740,281 | 10/1988 | Chlanda | 204/151 |
| 4,775,480 | 10/1988 | Milton et al. | 210/652 |

FOREIGN PATENT DOCUMENTS

0249925 12/1987 European Pat. Off. ............ 13/2
2185248 7/1987 United Kingdom ............... 23/47
8606646 11/1986 World Int. Prop. O. ............ 13/2

*Primary Examiner*—John F. Niebling
*Assistant Examiner*—Arun S. Phasge
*Attorney, Agent, or Firm*—Gerard P. Rooney; Karen A. Michaelsen

[57] ABSTRACT

The present invention is a method and apparatus of controlling a raw salt stream to be treated in an electrodialytical water splitter. An aqueous salt feed stream is fed to an electrodialysis water splitter and a dilute salt stream is withdrawn from the water splitter. The dilute salt stream is fed to an electrodialysis unit comprising a concentration compartment and a diluting compartment, at least part of the dilute salt stream being fed to the concentration compartment. An electrodialysis product stream is withdrawn from the concentration compartment. The product stream and the raw salt stream are controllably combined to form the aqueous feed stream. In accordance with the method of the present invention the salt concentration of the product stream can be maintained below the salt concentration of the raw salt stream. The pH of aqueous salt feed stream can be controlled based on the pH of electrodialysis unit product stream.

21 Claims, 4 Drawing Sheets

METHOD AND APPARATUS TO CONTROL A SALT STREAM TO BE TREATED IN AN ELECTRODIALYTIC WATER SPLITTER

BACKGROUND OF THE INVENTION

The present invention relates to the field of treating aqueous salt solutions, and more particularly, the invention relates to controlling the salt stream to be treated in an electrodialytic water splitter.

Electrodialytic processes are used to recover acids and bases from materials comprising soluble salt. The process for recovering acid uses an electrodialytic water splitter to regenerate acid and a dilute salt solution. This process is useful to regenerate spent process materials for reuse rather than disposing of them.

Pickling baths, for example, are employed to remove the scale, oxides and other impurities from metal surfaces such as stainless steel. These baths comprise inorganic acids such as hydrochloric acid, sulfuric acid, phosphoric acid, nitric acid, and hydrofluoric acid, and commonly are mixtures thereof. In use, the bath gradually becomes exhausted due to the reaction of the acids with the oxides, scale, etc. Eventually, the bath is converted to a spent solution comprising salts and some free (unreacted) acid. This spent solution must then be disposed and the acid must be replaced at a cost which can be very substantial.

The economic impact of disposing of the spent process materials can be as expensive as the cost of replacing the acid bath. Moreover, the environmental impact of disposing of these materials is of significant concern. One method of disposing of spent pickling liquor requires neutralizing the liquor with lime to precipitate the metal values and fluorides, and then landfilling the solid waste, with the remaining solubles being discharged after further treatment. However, this disposal process is very expensive and, because of the toxicity of the residue, especially if it contains fluoride ions, significant environmental damage can occur if it is improperly disposed.

Processes are known for the recovery of free acid from materials containing the same. They include (a) diffusion dialysis, (b) acid retardation using ion exchange resins, and (c) "the Ruthner process". Diffusion dialysis is the process of removing free acid from a liquid by transporting acid from a compartment containing the liquid across a membrane to adjacent compartments containing water, where the transport driving force is the concentration gradient of acid across the membrane. Acid retardation is the process of absorbing free acid from the material by use of an ion exchange resin, removing the ion exchange resin containing the acid from the material, and then washing the ion exchange resin with water to desorb the acid. "The Ruthner process" is the process of isolating free acid from a liquid via an evaporative crystalization process.

Each of the above mentioned processes has major shortcomings. With diffusion dialysis, acid recovery diminishes as the concentration gradient is reduced. With acid retardation using ion exchange resin, acid recovery is limited by the absorption and desorption capacity of the resin. Moreover, both processes have the added problem of disposing of the remaining acid-depleted salt stream. With "the Ruthner process" the regenerated acid normally contains five to ten times the metal content as the acid produced by the above mentioned processes. Moreover, "the Ruthner process" is energy intensive and highly corrosive to the process equipment.

Electrodialytic water splitting processes for regenerating acids and base from salts are known. For example, in U.S. Pat. Nos. 4,082,835 and 4,107,015, processes are disclosed for regenerating scrubbing solutions used in stripping $SO_x$ from flue gases by feeding salt-containing product solutions from the stripping step through an electrodialytic water splitter. Also, in U.S. Pat. No. 4,504,373, a process is disclosed for regenerating a dilute sulfuric acid solution for use in the processing of rayon from a spent rayon spin bath containing a sulfate salt by subjecting the salt to electrodialytic water splitting.

In U.S. Ser. No. 196,829, filed May 16, 1988 to Chlanda et al., commonly assigned, a process for recovering mixed acids from mixed salts at high current efficiency is disclosed. The process comprises the steps of providing an electrodialytic water splitter comprising at least one unit cell, each unit cell defining at least two compartments, feeding an aqueous solution comprising at least two salts formed from at least two different anions to one compartment, one of said anions being fluoride; feeding a liquid comprising water to another compartment; passing current through said electrodialytic water splitter to produce an aqueous product comprising mixed acids formed from the different anions in one compartment.

U.S. Pat. No. 4,740,281 discloses a recovery process that combines electrodialysis with electrodialytic water splitting. The process solution comprising acid and salt is initially subjected to electrodialysis in an apparatus employing cation and anion permselective membranes to recover the free acid from the process solution. During the operation of the electrodialysis step, the hydrogen ions of the free acid are transported across cation permselective membranes from a compartment containing the process solution to a compartment in which the hydrogen ions combine with anions to form acid which can be recovered. The remaining acid depleted product, mainly comprising metal salt, is recovered and is then subjected to electrodialytic water splitting to convert the salt into acid and base. The acid from the electrodialytic water splitting step can be combined with the recovered acid from the electrodialysis step and reused, further concentrated, sold, etc. At least part of the depleted salt solution from the electrodialytic water splitter is supplied to a dilute salt solution holding tank. The weak salt solution is further depleted in an electrodialysis unit having a diluting compartment and a concentration compartment. The depleted salt is fed to the diluting compartment and is further diluted. The concentrated product from the concentration compartment is supplied to a filtrate tank where it is combined with the salt solution at least part of which is fed to the salt compartment of the electrodialytic water splitter.

SUMMARY OF THE INVENTION

The present invention is an improved, energy efficient method and related apparatus for recovering and regenerating acid and base from a salt solution. The process has particular utility for the recovery and regeneration of mixed acids from spent pickle liquors.

The present invention is a method of controlling a raw salt stream to be treated in an electrodialytic water splitter. An aqueous salt feed stream is fed to an electrodialysis water splitter and a dilute salt stream is withdrawn from the water splitter. The dilute salt stream is fed to an electrodialysis unit comprising a concentration compartment and a diluting compartment, at least part of the dilute salt stream being fed to the concentration compartment. An electrodialysis product stream is withdrawn from the concentration compartment. The product stream and the raw salt stream are controllably combined to form the aqueous feed stream to the water splitter.

In accordance with the method of the present invention the salt concentration of the product stream can be maintained below the salt concentration of the raw salt stream. Preferably, the salt concentration of the product stream is from 0.01 N to 1.0 N, and the salt concentration of the raw salt stream is from 0.5 N to 5.0 N provided that the salt concentration of the product stream is lower than the salt concentration of the raw salt stream.

Alternatively, the pH of the aqueous feed stream can be controlled by the relative production of acid and base in the water splitter and/or the pH of the aqueous feed stream can be controlled by controlling the relative flow rates of the product stream and the raw salt stream. Preferably, the pH of the aqueous feed stream is maintained below 7.

The present invention also includes an apparatus comprising an electrodialytic water splitter, and an electrodialysis unit comprising a concentration compartment and a diluting compartment. There is a dilute salt stream line communicating between the water splitter and the concentration compartment and an electrodialysis product stream line communicating from the concentration compartment of the electrodialysis unit. A raw salt stream line communicates with the electrodialysis product stream line. An aqeuous salt feed stream line communicates from the combination of the electrodialysis product stream line and raw salt stream line to the water splitter.

It has been found that the electrodialysis unit has improved membrane life and stability, and improved electrical efficiency when using the method and apparatus of the present invention compared to methods and apparatus known in the art. By improved membrane life, it is meant that the membrane can continue in use and does not have to be removed from service due to fouling by insoluble compounds. By membrane stability, it is meant that the membrane is chemically stable and that its electrical and mechanical properties remain in a useful range upon exposure to fluids in the process.

DETAILED DESCRIPTION OF THE INVENTION

The present invention is an improved method and apparatus to control an aqueous salt stream to be treated in an electrodialytic water splitter. Preferably the present invention is an improved method and apparatus to convert salt to acid and base using a combination of an electrodialytic water splitter and an electrodialysis unit. The function of the electrodialysis unit is to remove excess water from the overall process and to recover and return the salt to the water splitter for further conversion. In accordance with the present invention, a salt feed stream fed to the electrodialytic water splitter is controlled by combining a raw salt feed stream with an electrodialytic product salt stream from the concentration compartment of the electrodialysis unit. The salt feed stream concentration and/or the pH can be controlled. The process can be controlled to operate more efficiently and to extend membrane life in the electrodialysis unit.

The preferred water splitter employed in performing the electrodialytic water splitting step of the process of the present invention is a three-compartment electrodialytic water splitter. A three-compartment electrodialytic water splitter comprises at least one unit cell, each unit cell comprising cation membranes, means for water splitting, and anion membranes arranged in alternating fashion to define base, acid, and salt compartments.

Employed in each unit cell are means for splitting water into hydrogen ions and hydroxyl ions. Most preferably, the means for splitting water into hydrogen and hydroxyl ions is a bipolar membrane. The bipolar membrane comprises a cation layer and an anion layer. The cation layer permits the cations to pass through, and the anion layer permits anions to pass through. The cation layer is a barrier to anions and the anion layer is a barrier to cations. Examples of bipolar membranes which are particularly useful include those described in U.S. Pat. No. 2,829,095 to Oda et al. (which has reference to water splitting generally), in U.S. Pat. No. 4,024,043 (which describes a single film bipolar membrane), and in U.S. Pat. No. 4,116,889 (which describes a cast bipolar membrane and is most preferred). However, any means capable of splitting water into hydrogen and hydroxyl ions may be used; for example, spaced apart anion and cation membranes having water disposed therebetween.

The cation membranes are designed to permit hydrogen ions and metal ions ($M^+$) to pass while preventing the passing of anions ($X^-$). The cation membranes employed in the electrodialytic water splitter may be moderately acidic (e.g. phosphonic group-containing) or strongly acidic (e.g. sulfonic group-containing) cation membranes having a low resistance at the pH at which they are employed. Particularly useful cation membranes are Dupont's Nafion ® 110 and 324 cation membranes. More preferably, the cation membranes are of the composition and construction as disclosed in U.S. Pat. No. 4,738,764 to Chlanda et al., commonly assigned.

The anion membranes are designed to permit the passage of anions having a charge of $n-$, where n is an integer, to pass while preventing the passage of cations. The anion membranes used in the electrodialytic water splitter are strongly, mildly, or weakly basic anion membranes. Usable membranes are, for example, commercially available from Ionics, Inc., Watertown, Mass.

(sold as Ionics 204-UZL-386 anion membrane), or from Asahi Glass Co. (sold under the trade name Selemion ® AMV or ASV anion permselective membranes).

Figure 1:
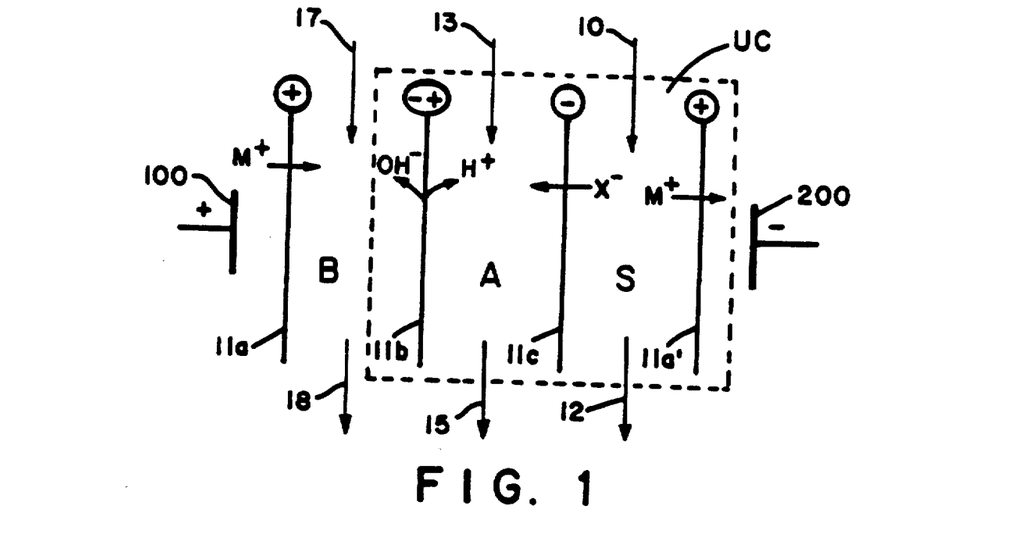
FIG. 1 schematically illustrates a three-compartment electrodialytic water splitter useful for carrying out the water splitting step of the present invention.

FIG. 1 schematically illustrates a typical design of a three-compartment electrodialytic water splitter employed to recover and regenerate acid and base from salt solutions. As illustrated, the three-compartment electrodialytic water splitter comprises, in series, an anode 100 (e.g. a platinum anode), and anolyte compartment, alternating base B, acid A, and salt S compartments, a catholyte compartment, and a cathode 200 (e.g. a platinum cathode). The base, acid and salt compartments of the three-compartment water splitter illustrated in FIG. 1 are defined by a plurality of serially arranged membranes as follows: a cation membrane 11a, a bipolar membrane 11b, anion membrane 11c, and a cation membrane 11a'. Although FIG. 1 shows four serially arranged membranes, the three-compartment electrodialytic water splitters are defined by a plurality of unit cells, each unit cell UC comprising an anion membrane, a cation membrane and a bipolar membrane (or equivalent structures capable of splitting water into hydrogen and hydroxyl ions).

In accordance with the invention, the anolyte and catholyte compartments can contain a salt, base or acid solution (e.g. KOH or dilute salt), the acid A and base B compartments can initially contain a liquid comprising water, added via 13 and 17, respectively, salt S compartment can initially contain a salt solution, typically comprising a fluoride salt MF and/or a salt MX of a different (second) anion (e.g. KF and/or KNO$_3$), added via line 10. Splitting of the salt into acid and base commences by applying a direct current through the water splitter 10 from the anode 100 to the cathode 200.

In the acid compartment A which is supplied with a liquid comprising water and, preferably, an electrolyte, hydrogen ions (H+) are added via the function of the bipolar membrane 11b. Simultaneously, anions (designated X- in the drawings) of the salt(s) are transported across the anion-membrane 11c into the acid compartment. The reaction of the hydrogen ions with the anions yields an acid product HX. The designation X- (and from that MX or HX) refers not only to monovalent anions but also to divalent anions, such as sulfates, and trivalent anions, such as phosphates, and mixtures thereof.

Cations in the salt compartment S simultaneously pass through the cation membrane 11a' to the catholyte and from the anolyte to the base B compartment. In the base B compartment, cations (M+) migrating through the cation membrane 11a react with the hydroxyl ions (OH-) generated by the bipolar membrane 11b' to produce a basified solution.

As also indicated in FIG. 1 metal ions are added to the catholyte compartment from the salt S compartment. Accordingly, the anolyte and catholyte solutions are typically continuously recirculated from the anolyte compartment to the catholyte compartment and back (or the reverse) to maintain a substantially constant concentration of acid (or salt) in each compartment.

The electrodialytic water splitter can be operated in a batch mode, a continuous mode, or variations thereof. Product solutions or portions thereof (e.g. when using a feed and bleed apportionment operation) optionally can be recycled for further concentration. Moreover, mechanisms for serial feed through similar compartments (not shown) may be employed. These and other modifications, changes and alterations to the design of the water splitter will not affect the scope of the invention and will be obvious to those of ordinary skill.

As illustrated in FIG. 1, the acid product from compartment A is removed via 15, the base product from base compartment B is removed via 18, and the depleted salt solution from compartment S is removed via 12.

The electrodialytic water splitter is ordinarily supplied with a direct current ranging from about 30 amps/ft$^2$ (<<300 A/m$^2$) to about 200 amps/ft$^2$ (<<2000 A/m$^2$), preferably from about 80 A/ft$^2$ (<<800 A/m$^2$) to about 120 A/ft$^2$ (<<1200 A/m$^2$) amps. The water splitter normally operates at a temperature of between about 10° C. and about 80° C., with a temperature range of between about 30° C. and 55° C. being preferred.

Figure 2:
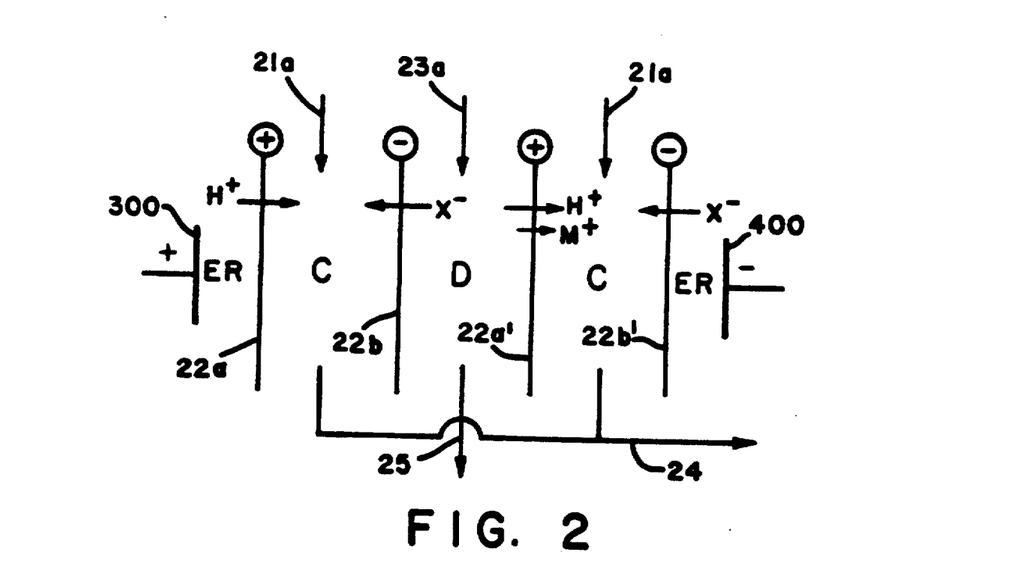
FIG. 2 schematically illustrates an electrodialysis apparatus useful for performing the electrodialysis step of the present invention.

The preferred apparatus employed in performing the electrodialysis step of the process of the present invention is known in the art and is schematically illustrated in FIG. 2. The electrodialysis apparatus includes at least one unit cell. In FIG. 2 two unit cells are illustrated, each comprising a cation exchange membrane and an anion exchange membrane (22a, 22b, and 22a', 22b', respectively). The unit cells are arranged to define alternating dilute compartment D and concentration compartment C.

The cation exchange membranes employed in the electrodialysis apparatus of the present invention may be moderately acidic (e.g. phosphonic group-containing) or strongly acidic (e.g. sulfonic group-containing) cation permselective membranes or acidic fluorocarbon cation permselective membranes. Preferably, the cation membranes are of the composition and construction disclosed in U.S. Pat. No. 4,738,764 to Chlanda et al., and commonly assigned. Other useful cation membranes are cation membranes made by Asahi Glass, Tokuyama Soda, as well as Dupont's Nafion ® acidic fluorocarbon membranes, such as Nafion ® 110, 901, and 324 cation membranes.

The anion membranes used in the electrodialysis apparatus of the present invention are strongly, mildly or weakly basic anion permselective membranes. Useful membranes are, for example, Toyo Soda's DF43 or Asahi Glass Company's anion permselective membranes sold under the trade name Selemion AMR, ASV or, membranes made by Tokuyama Soda and sold under the trade name AM1, AM2, ACH 45T. Most preferably, the anion permselective membranes used in the present invention are the Asahi Glass AMV membranes.

Referring to FIG. 2, the unit cells, which in practice may number up to two hundred or more, are arranged between an anode 300 (e.g. a nickel or platinum anode) and a cathode 400 (e.g. a stainless steel or platinum cathode). In operation, an aqueous solution, preferably contains an electrolyte. Typically, an alkali solution such as a 2 Molar KOH is used in the electrode rinse (ER) compartment. The dilute salt solution from the water splitter is supplied via 23a to the concentration compartment C and optionally to diluting compartment D. An aqueous stream, preferably a mildly acidic dilute salt solution is fed to diluting compartment D. Direct current is then passed from the anode 300 to the cathode 400 causing hydrogen ions from diluting compartment D, and metal ions from compartment D and the electrode rinse ER to migrate toward the cathode. Simultaneously, anions of the acid and salt migrate toward the anode 300, passing through the anion permselective membranes. Accordingly, in the concentration compartments C salt and acid are formed and in the diluting compartment D a salt and acid depleted salt solution remains. The product produced in the concentration compartment C generally contain at least about 0.5 N concentration of salt and 0.01 N concentration of acid. The reaction product including salt and acid from the concentration compartments C is then withdrawn via 24 and is recycled to the salt compartment of the water splitter as described below.

Figure 3:
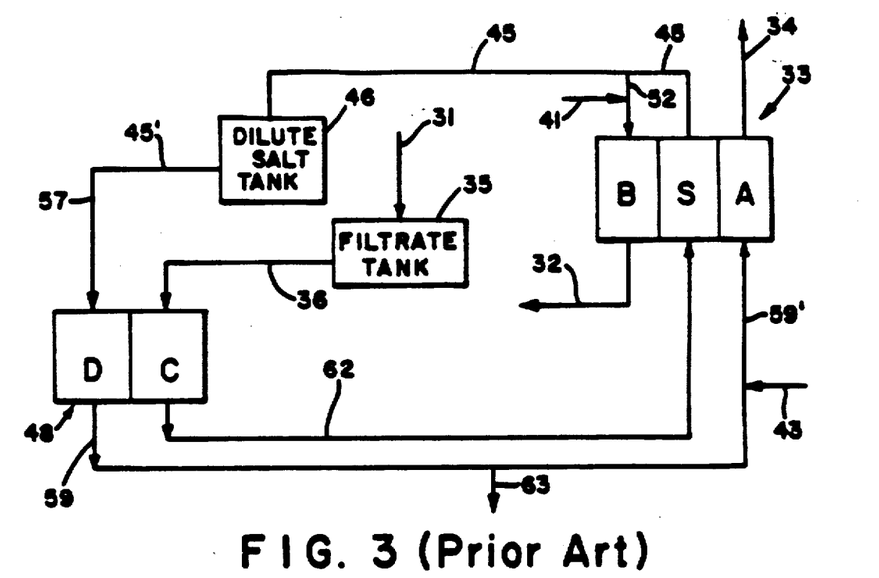
FIG. 3 schematically illustrates a prior art process.

FIG. 3 illustrates a prior art method to convert a salt stream feed to acid and base using an electrodialytic water splitter 33 coupled with electrodialysis unit 48. This approach is disclosed, for example, in U.S. Patent No. 4,740,281. A raw salt stream which is preferably filtered is fed via line 31 to filtrate tank 35. The raw salt stream from tank 35 is fed to the concentration compartment C of elejctrodialysis unit 48. An electrodialysis product solution is removed from concentration compartment C via electrodialysis product stream line 62.

In the electrodialytic water splitter apparatus 33, an aqueous solution such as water, and preferably a weak salt is supplied to base compartment B via base feed stream line 41. Water or a dilute acid solution is added to acid compartment A via acid feed stream line 43. A concentrated salt solution is fed to salt compartment S of water splitter 33.

Acid and base are generated in acid and base compartments A and B, respectively, and are removed via acid and base stream lines 32 and 34. Depleted or dilute salt solution from salt compartment S is removed via dilute salt stream line 45. The diluted salt solution is supplied to the diluting compartment D of the electrodialysis unit 48. Optionally, there is a dilute salt holding tank 46 to which dilute salt stream is supplied via line 45. In the electrodialysis unit 48, cations from the salt and hydrogen ions are transported to the concentration compartment C when current is supplied across the electrodes. Depleted salt stream is then withdrawn via line 59 and removed via line 63 and/or fed to the acid compartment A of water splitter 33 via line 59'.

While this prior art method is satisfactory, it has several limitations. The use of the basic raw salt stream via line 36 to the electrodialysis unit has resulted in fouling of the membranes in the electrodialysis unit 48 and membrane stability problems. The basic raw salt stream is saturated with small amounts of dissolved impurities. As the stream becomes more concentrated the impurities precipitate out and foul the membranes in the electrodialysis unit. Typical impurities of this type include silica ($SiO_2$), calcium, iron, chrome and nickel compounds. Basic salt streams are those having a pH of greater than 7 and typically from 8 to 11.

The present invention is an improved method to control the raw salt stream to be treated in an electrodialytic water splitter. The present invention overcomes electrodialytic unit membrane fouling problems and improves overall current efficiency.

Figure 4:
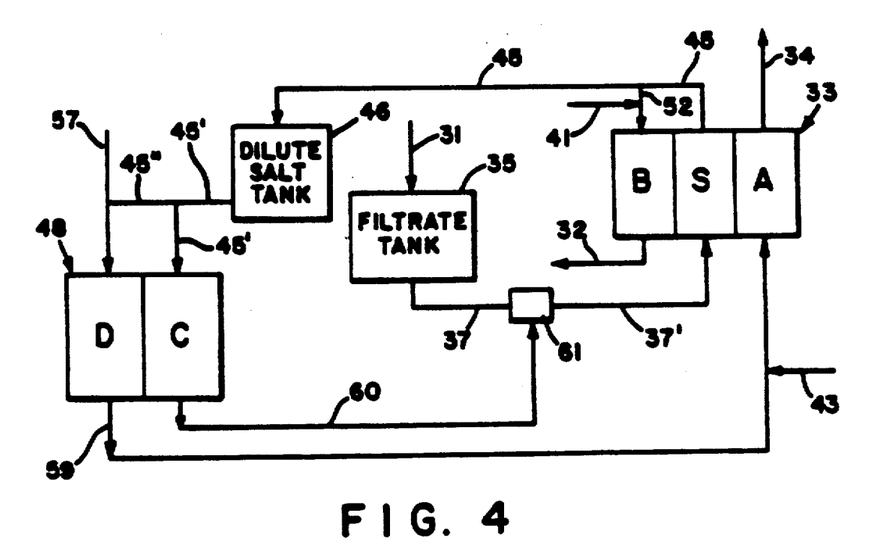
FIG. 4 schematically illustrates a preferred embodiment of the process of the present invention employing an electrodialysis apparatus of the type illustrated in FIG. 1 and a three-compartment electrodialytic water splitter of the type illustrated in FIG. 2.

The present invention is schematically illustrated in FIG. 4. A raw salt stream is fed to the salt compartment S of the three-compartment water splitter 33. The raw salt stream is optionally and preferably filtered by a suitable filter means (not shown). The filtered raw salt stream is fed via line 31 to filtrate tank 35 which is optional. A filtered raw feed stream is supplied from the filtrate tank 35 to the salt compartment S via raw salt stream line 37.

In the electrodialytic water splitter apparatus 33, an aqueous solution such as water, and preferably a weak salt is supplied to base compartment B via base feed stream line 41. Water or a dilute acid solution is added to acid compartment A via acid feed stream line 43.

As described above with reference to FIG. 1, acid and base are generated in the water splitter from the salt in salt feed stream 37'. Solutions of acid and base are generated in acid and base compartments A and B, respectively, and are removed via acid and base stream lines 32 and 34. Depleted or dilute salt solution from salt compartment S is removed via dilute salt stream line 45. The diluted salt solution is supplied to the electrodialysis unit 48. Optionally, there is a dilute salt holding tank 46. At least a part of the dilute salt stream is supplied to dilute salt holding tank 46 via line 45. At least part of the dilute salt solution is then supplied via dilute salt stream line 45' to the electrodialysis unit 48. Optionally, a portion of the dilute salt stream 45 can be supplied to base compartment B via line 52.

The dilute salt solution via dilute salt stream line 45' is supplied to the concentration compartment C of electrodialysis unit 48. An aqueous solution, preferably an acidic solution is supplied to the dilution compartment D via diluting compartment feed stream line 57. Optionally the diluting compartment D feed stream is supplied with a dilute salt stream 45". The dilute salt stream 45" is preferably slightly acidic. The product of the diluting compartment D, substantially water, is removed from the electrodialysis unit 48 via dilution compartment removal line 59 for reuse. It can optionally be used to feed acid compartment A of water splitter 33.

The product of the concentration compartment C is an electrodialysis product stream which is a salt solution. The product from the concentration compartment C is supplied from the C via electrodialysis product stream 60 and combined with salt feed stream 37. There can optionally be a combining means such as salt combining tank 61 into which streams 37 and 61 are fed. The resulting combined salt feed stream which is fed via line 37' to salt compartment S of the water splitter.

The electrodialysis unit can be used to control the concentration of the salt in the electrodialysis product stream (line 60). This product stream via line 60 is then combined with raw salt feed stream from line 37. The combined raw feed stream being fed via line 37' to the salt compartment S of water splitter 33 is controlled by controllably combining the electrodialysis product stream (line 60) and the raw salt stream (line 37). The concentration and/or the pH of the salt feed stream 60 can be controlled.

In a preferred embodiment the salt concentration in the electrodialytic product stream (line 60) is maintained below the salt concentration of the raw salt stream (line 37). The salt concentration in feed stream 60 can thereby be controlled by a dilute salt stream (i.e. line 45). The ability to dilute the raw salt stream (line 37) can be used to control concentration and lengthen membrane life. The use of the electrodialysis unit 48 where dilute salt stream 45 is fed to the concentration compartment C enables the flow rates to be varied. Operation at higher flow rates with more dilute solutions also helps to increase efficiency and prevent fouling of the membranes in electrodialysis unit 48. The salt concentration of the product stream (in line 60) is preferably from 0.01 to 4.0 N, more preferably from 0.4 N to 0.25 N, and most preferably from 0.4 N to 0.8 N and the salt concentration of the raw salt stream is up to below saturation and preferably from 0.5 N to 5 N provided that the salt concentration of the product stream is lower than the salt concentration of the raw salt stream.

Depending on the process, the electrodialysis product stream 60 can be acidic, neutral or basic. The amount of product combined with the raw salt stream 37 can be used to control the pH of the combined feed stream 37' to the salt compartment S. Alternatively, the pH of the aqueous feed stream (line 37') is controlled by controlling the flow rates of the product stream (line 60) and the raw salt stream (line 37). Preferably, the pH of the feed stream is maintained below 7. The pH of the feed stream can alternatively be controlled by the relative production of acid and base in water splitter 33.

Figure 5:
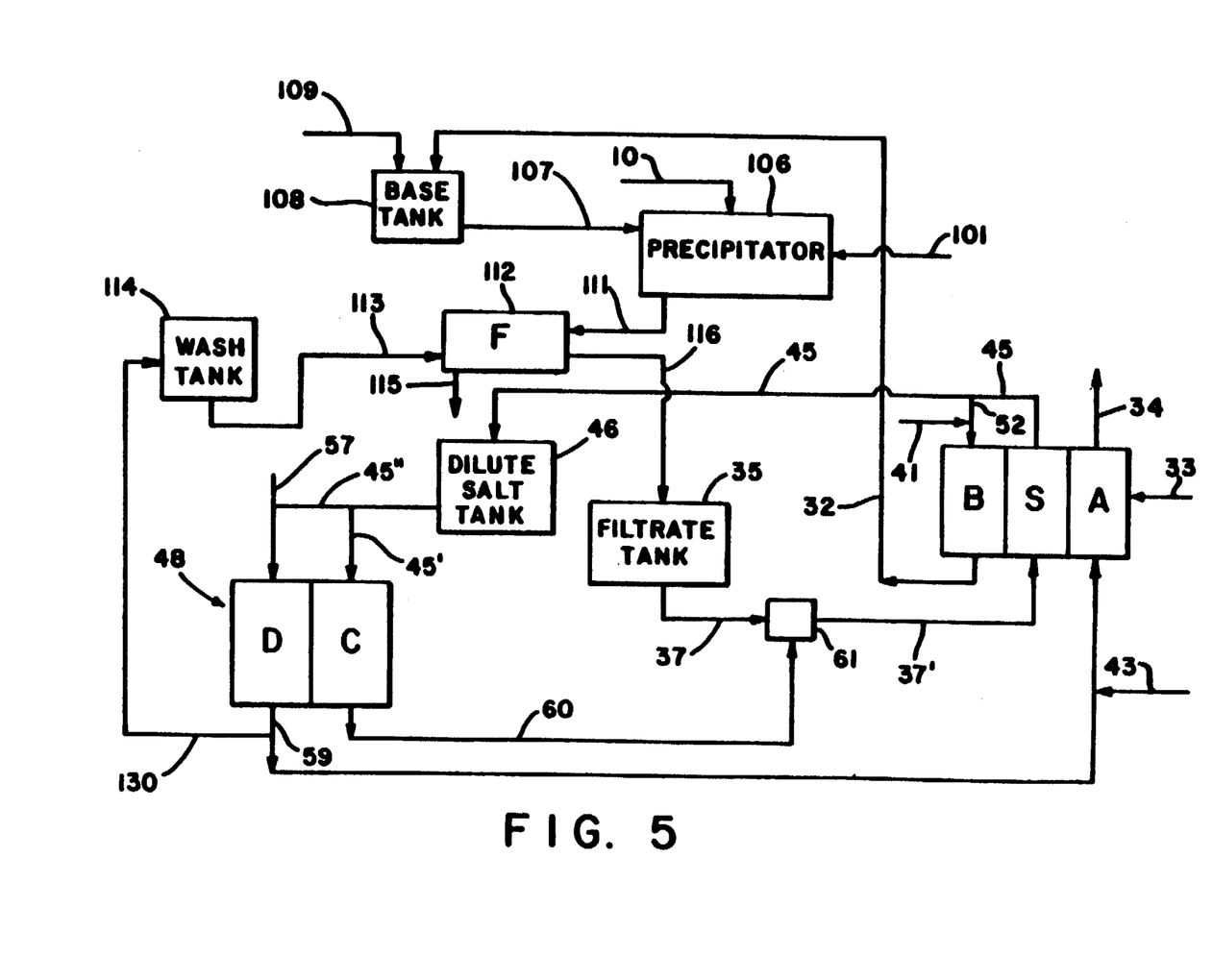
FIG. 5 schematically illustrates a preferred embodiment of the process for treating spent stainless steel pickle liquor.

FIG. 5 illustrates a preferred embodiment of the present invention. Elements common to FIG. 4 have the same reference characters. Reference is made to the above description with regard to FIG. 4.

FIG. 5 schematically illustrates a process for regenerating acids from spent stainless steel pickling baths comprising nitric acid and hydrofluoric acid. As shown, spent stainless steel pickling liquor (raw salt solution) is supplied via line 101 to a precipitation chamber 106 which is initially supplied with a basified solution (e.g. KOH, NaOH, $NH_4OH$, or mixtures thereof, preferably an alkali metal hydroxide, and most preferably KOH) through line 10. The precipitator 106 can optionally be supplied initially with a basic solution via 107 which reacts with the salt solution to remove heavy metals which are present in the salt solution. In the event the spent process material contains heavy metal ions (for example, Ni, Fe, Cr, Mn, etc.), the basified solution will react to form hydroxides thereof which will precipitate out of solution. The resulting product (for example, a suspension) is then fed through line 111 to a filtration unit 112 (e.g. a plate and frame, filter press). In filtration unit 112, the precipitate is filtered from the resulting product. The precipitate can be washed, for example, with water and/or with an aqueous depleted salt solution supplied via line 113 from wash tank 114. The precipitate is then withdrawn via line 115 and can either be reused or disposed of.

The aqueous filtrate of soluble salt is then fed via line 116 to the salt compartments of the three-compartment electrodialytic water splitter 33. Preferably the filtrate is removed via 116 and supplied to a filtrate tank 35. The filtrate from tank 35 is then supplied via line 37 to the salt compartment S of a three-compartment electrodialytic water splitter 33. A liquid comprising water or dilute acid is initially fed to the acid compartment A via line 43. A liquid comprising water and/or an aqueous salt solution is supplied to the base compartment B in base feed stream via line 41. The operation of a three-compartment electrodialytic water splitter is as described with respect to FIG. 1 above, with an acid product stream being withdrawn via line 34 and a base product stream being withdrawn via line 32.

Depleted salt solution in salt compartment S is removed in a dilute salt stream via line 45 and at least a portion thereof is supplied to the concentration compartment C of electrodialysis unit 48. The operation of unit 48 is described above with reference to FIG. 3. Optionally, and preferably the dilute salt stream 45 is first fed to a dilute salt holding tank 46. A dilute salt stream via 45' is fed from dilute salt tank 46 to electrodialysis unit 48.

The dilute salt solution via dilute salt stream line 45' is supplied to the concentration compartment C of electrodialysis unit 48. An aqueous solution, preferably an acidic solution can be supplied to the dilution compartment D via dilution compartment feed stream line 57. Optionally, the dilution compartment feed stream is supplied with a dilute salt stream 45". The dilute salt stream 45" is preferably slightly acidic. The solution from the diluting comparment D of the electrodialysis unit 48, substantially only water, is removed via 59. A portion of the solution can be supplied via 59 to the acid compartment A of the three-compartment electrodialytic water splitter, with the remainder being supplied via 130 to a tank 114 which supplies wash solutions via 113 to the filter unit 112.

By varying the specific concentrations of the acid and base generated, the permeation selectiveness (permselectiveness) of the membranes to various anions and cations, the dilute salt stream in line 45 can be controlled to be acidic, basic, or neutral. An acidic solution is preferred. The depleted salt solution from line 45 can be split into two streams. A portion of the aqueous depleted salt can be recycled via line 45 to dilute salt tank 46 and then through line 45' to electrodialysis unit 48 while another portion can optionally be supplied to the base compartment B via line 52.

The electrodialysis product stream which is concentrated salt stream is withdrawn via line 60 from concentration compartment C of electrodialysis unit 48. The stream in line 60 is combined with raw salt stream from line 37 to more efficiently control the operation of the water splitter 33. There can optionally and preferably be a combining means such as combining tank 61 into which streams 37 and 61 are fed. The resulting combined solution in the feed stream which is fed via line 37' to salt compartment S of water splitter 33. The use of the electrodialysis unit 48, with a controlled dilute salt stream feed via line 45' enables it to operate more efficiently with less membrane fouling.

The base generated in the base compartment B is removed via 32 and supplied to a base holding tank 108. If necessary, additional, or make up base may be added to the base tank 108 via line 109 to insure proper concentration of base for supply to the precipitation 106. Acid generated in the acid compartment A is removed via line 34.

The process of the present invention is capable of processing raw salt streams having a wide concentration of a variety of salts, mixtures of acids and salts, or mixtures of bases and salts. The salts can include inorganic and organic salts. Salts which can be treated include but are not limited to those having cations which include mono, di and trivalent metallic and non-metallic cation including ammonium. The anions include monovalent anions such as halides, divalent anions such as sulfates, trivalent anions such as phosphates and mixtures thereof.

Typical salts include inorganic and organic salts, which are water soluble and can form soluble bases and acids. Examples include but are not limited to NaCl, $NaNO_3$, $NH_4Cl$, $NH_4OAc$, $Na_2SO_4$, $NH_4NO_3$, $Na_3PO_4$, $KNO_3$, KF and mixtures thereof.

Typical acid salt combinations which can be treated include HCl/NaCl, acetic acid/NaOAc, HCl/$NH_4Cl$, $Na_2SO_4$/$H_2SO_4$, $NaNO_3$/$HNO_3$, $NH_4NO_3$/$NHO_3$, $Na_3PO_4$/$H_3PO_4$, or HF/KF. Mixtures of acids may also be treated with respect to cationic impurities, e.g. HF/$HNO_3$/Ni($NO_3$)$_2$ can be processed to give purified HF/$HNO_3$. Typical base and salt combinations which can be treated include NaOH/NaCl, NaOH/NaOAc, NH$_4$OH/NH$_4$Cl, NaOH/NaNO$_3$, NH$_4$OH/NH$_4$NO$_3$, and Na$_3$PO$_4$/NaOH.

The present invention is particularly useful for solutions containing sulfate, halide, nitrate salts or mixtures thereof.

Typically, the salt concentration of the raw salt feed in line 37' is at least about 0.4 molar, and preferably at least about 1 molar. While the raw salt stream can be acidic, basic or neutral, the raw salt stream from a process such as a pickling process has been found to be basic, having a pH from 8–11. The concentration of salt in the product stream from unit 48, line 60 from the concentration compartment C of electrodialysis unit 48 is preferably less than that of the raw salt stream (line 37), and preferably has a pH of less than 7 where the raw salt stream is basic. The free acid content of the product stream 60 to treat a pickling process raw salt stream is preferably at least 0.1 molar and preferably from 0.05 to 0.2 molar.

The coupled use of the electrodialysis water splitter 33 and the electrodialytic unit 48 with dilute salt stream 45' fed to the concentration compartment C has several advantages. Initially, the whole system can be controlled more efficiently without having to add any additional water to water splitter 33 or electrodialysis unit 48 to attain the control of the present invention. The feed of the dilute salt (line 45') to the concentration compartment C, preferably a slightly acid feed, enables unit 48 to operate more efficiently, to have longer membrane life and greater membrane stability. Additionally, the more dilute feed stream (37') to the water splitter and the lower pH enables the electrodialysis unit to operate at higher flow rates which helps keep membranes clean.

Limiting the salt concentration in C maximizes water recovery from D. The concentration of the salt transported in the electrodialysis unit from D to C compartments is $C_T$. $C_T$ is the weight percent of salt transported from dilute compartment D to concentration compartment C. A key function of the electrodialysis unit is to maximize water recovery for a given flow rate. There is greater water recovery from D when the $C_T$ is higher. Preferably the $C_T$ is maximized by operating with the salt concentration in the concentration compartment C as low as possible.

The following example illustrates the practice of the present invention. These examples should not be construed in any way as limiting the invention to anything less than that which is disclosed or which would have been obvious to one or ordinary skill in this art therefrom.

In the example the current efficiency (n, eta) was calculated by mass balance, i.e. the change in equivalents of the feed and/or product was determined from volume and concentration change. H$^+$ concentration was determined by titration to pH 5 with standard NaOH solution. The formula for calculation of current efficiency is:

Current Efficiency = equivalents of salt and acid gained in product or lost from feed ÷ (number of cells × current ($A$) × time (sec) ÷ 96,500 (coul/mole))

COMPARATIVE EXAMPLE 1

A commercial plant was set up with the water splitter and electrodialysis unit operating in accordance with FIG. 3. 160 cell pairs with a 4 square foot effective area each were installed in the electrodialysis unit. The cation membranes were made by Aquatech Systems according to U.S. Pat. No. 4,738,764 and the anion membranes were AMV, supplied by Asahi Glass.

Figure 6:
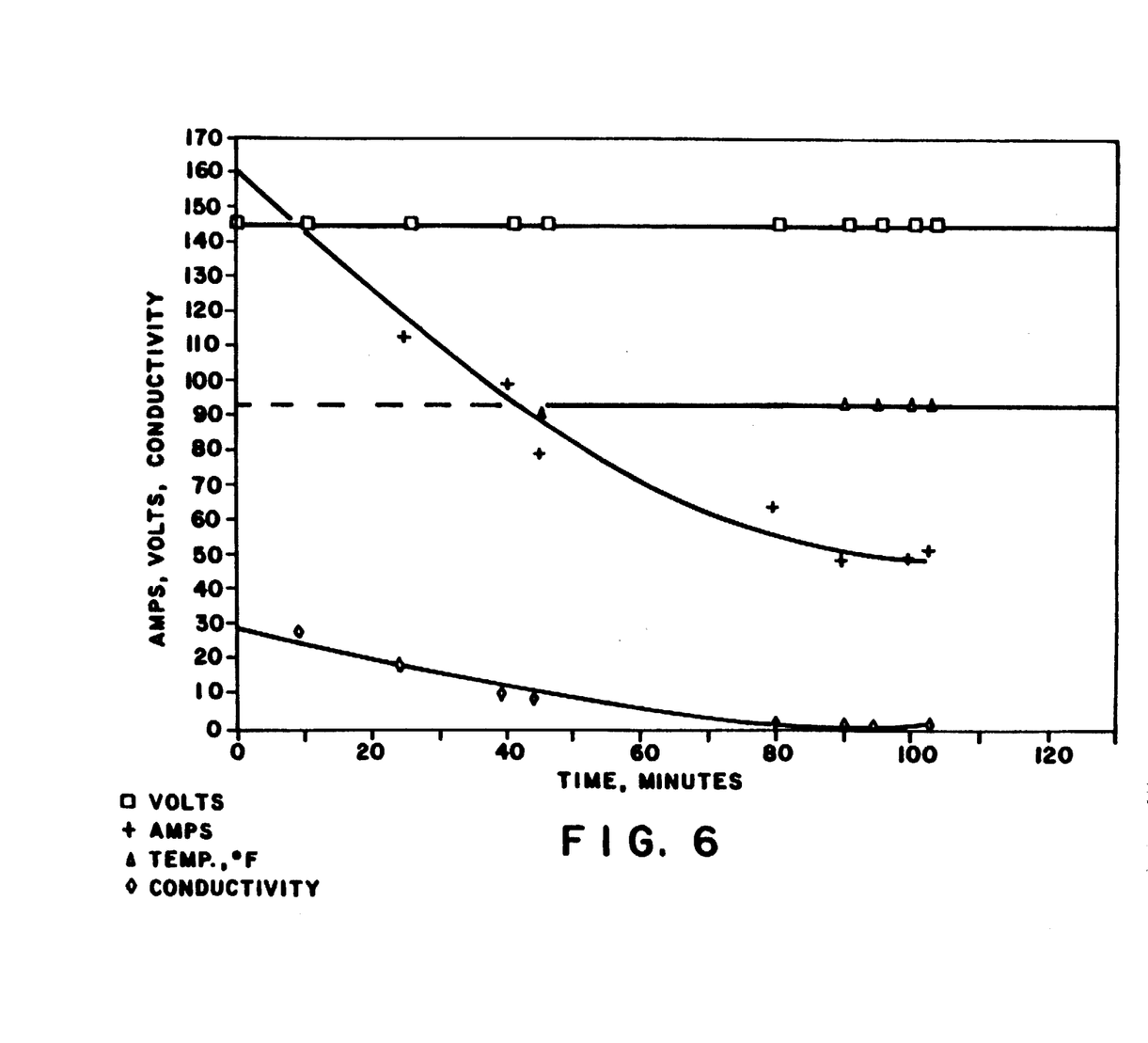
FIG. 6 is a graph of electrical properties versus time for an electrodialysis unit.

Solutions were recirculated in the dilution compartment D and concentration compartment C at a linear velocity of 4 cm per second and a direct current from a 175 V, 160 A power supply. The diluting compartment D was operated in a batch mode with an initial salt conductivity of a 30 mS/cm (millisiemen/centimeter). The concentration compartment was fed continuously with a feed salt solution at a conductivity of 120 mS/cm and a pH of 10.5. During the initial operation in batch mode the voltage and current characteristics of the electrodialysis cell were as shown in FIG. 6. The measured $C_T$ was 1.36 N or approximately 7.8% KF. After 80 days of operation the cell stack performance had deteriorated significantly. The batch time to go from 30 mS/cm to 5 mS/cm had increased from 85 minutes to 120 minutes, indicating poor current throughput at the set voltage limit. This was indicated by the fact that the maximum current-voltage data was as follows @ 37.5 mS/cm, 110° F., 154 V, maximum current was 100 A. By comparison, the maximum current at the same conditions on day 0 was over 160 A.

In an attempt to restore electrodialysis cell performance the following were attempted:
 (a) an acid wash with 3 normal acid (1 N HNO$_3$ + 2 N HF) was passed through the cell.
 (b) Polarity was reversed for 30 minutes.

Both steps failed to restore initial performance. The cell was thereafter disassembled and the membranes examined. The anion membranes were fouled with precipitate. The precipitate was characterized to be K$_x$Na$_y$M$_z$F$_6$ where M was Fe, Cr or Ni and x,y,z were 0, 1, 2 or 3. The anion membranes were also suspected to be porous or leaky.

EXAMPLE 1

In light of the poor performance of the cell in Comparative Example 1, the process of the present invention according to FIG. 4 was installed in the process shown in FIG. 5. As shown in FIG. 4 the concentration loop of the electrodialysis unit was directly coupled to the salt loop of the water splitter as set forth in the description above. The water splitter was set to generate a solution of 1.6 N KOH and 3.0–3.2 N acid. The concentrations were such that excess acid leaked into the salt loop to maintain its pH at 5.5. A new electrodialysis cell stack similar to that in Comparative Example 1 was installed. The performance of the unit was as follows:
 Batch time—82 minutes
 Dilute conductivity range from 48 mS/cm down to 10 mS/cm
 Temperature 100° F.
 Measured $C_T$ 1.62 N (about 9.4 wt. % KF)

The cell was subsequently operated for 300 days under steady performance conditions. Batch times have remained stable at 82–85 minutes. Performance of the plant is excellent.

EXAMPLE 2

The following is a hypothetical example of a process as illustrated in FIG. 5. The combined feed stream 37' is at a concentration of from 0.5 to 5 N salt. The dilute salt stream 45 is at a concentration of from 0.4 to 0.8 N salt, with the salt concentration of stream 37 being greater than the concentration in stream 60. The solubility of residual metals in the feed is thereby increased so that precipitation on the membrane (i.e. fouling) is minimized.

What is claimed is:

1. An apparatus comprising:
   an electrodialytic water splitter;
   an electrodialysis unit comprising a concentration compartment and a diluting compartment,
   a dilute salt stream line communicating from the water splitter to the concentration compartment,
   an electrodialysis product stream line communicating from the concentration compartment of the electrodialysis unit;
   a raw salt stream line communicating with the electrodialysis product stream line; and
   a salt feed stream line communicating from the combination of the electrodialysis product stream line and raw salt stream line to the water splitter.

2. The apparatus as recited in claim 1 further comprising a dilute salt tank communicating with the dilute salt stream line and the concentration compartment of the electrodialysis unit.

3. The apparatus as recited in claim 1 further comprising a combination tank communicating with the raw salt stream line and the electrodialysis product stream line and the aqueous salt feed stream line.

4. A method of controlling a raw salt stream to be treated in an electrodialytic water splitter comprising the steps of:
   feeding salt feed stream to an electrodialysis water splitter;
   withdrawing a dilute salt stream from the water splitter;
   feeding the dilute salt stream to an electrodialysis unit comprising a concentration compartment and a diluting compartment, at least part of the dilute salt stream being fed to the concentration compartment;
   withdrawing an electrodialysis product stream from the concentration compartment;
   maintaining the salt concentration of the product stream below the salt concentration of the raw salt stream; and
   controllingly combining the product stream with the raw salt stream to form the feed stream.

5. The method as recited in claim 4 wherein the salt concentration of the product stream is from 0.01 N to 4.0 N, and the salt concentration of the raw salt stream is from 0.5 N to 5.0 N provided that the salt concentration of the product stream is lower than the salt of the raw salt stream.

6. The method as recited in claim 4 further comprising splitting the salt in the water splitter to form acid and base.

7. The method as recited in claim 4 wherein the pH of the feed stream is controlled by the relative production of acid and base in the water splitter.

8. The method as recited in claim 7 wherein the pH of the aqueous feed stream is maintained below 7.

9. The method as recited in claim 6 wherein the pH of the feed stream is controlled by balancing acid and base concentrations in the water splitter such that there is a net leakage of acid to the salt loop.

10. The method as recited in claim 4 wherein the pH of feed stream is controlled by controlling the relative flow rate of the product stream and the raw salt stream.

11. The method as recited in claim 4 wherein the pH of the aqueous feed stream is maintained below 7.

12. The method as recited in claim 4 wherein the water splitter is controlled to maintain the pH of the dilute salt stream below 7.

13. The method as recited in claim 4 wherein the salts are selected from the group consisting of NaCl, NaNO$_3$, NH$_4$Cl, Na$_2$SO$_4$, NH$_4$OAc, NH$_4$NO$_3$, Na$_3$PO$_4$, KNO$_3$, KF and mixtures thereof.

14. A method of converting salt in a raw salt stream to acid and base in a water splitter comprising a salt compartment comprising:
   feeding a salt feed stream to the salt compartment of the water splitter;
   withdrawing a dilute salt stream from the salt compartment of the water splitter;
   feeding the dilute salt stream to an electrodialysis unit having a diluting compartment and a concentration compartment, at least part of the dilute salt solution being fed to the concentration compartment;
   withdrawing an electrodialysis product stream from the concentration compartment;
   combining the raw salt stream and the electrodialysis product stream to form the salt feed stream; and
   controlling the electrodialysis unit to maintain, the salt concentration of the electrodialysis stream below the salt concentration of the raw salt stream.

15. The method of claim 14 wherein the water splitter further comprises an acid compartment, and a base compartment.

16. The method of claim 14 further comprising the steps of controlling the pH of the salt stream feed being fed to the water splitter.

17. The method of claim 16 wherein the pH of the salt stream feed is from 2 to 6.9.

18. A method of converting salt in a raw salt stream to acid and base in a water splitter comprising a salt compartment comprising:
   feeding a salt feed stream to the salt compartment of the water splitter;
   withdrawing a dilute salt stream from the salt compartment of the water splitter;
   feeding the dilute salt stream to an electrodialysis unit having a diluting compartment and a concentration compartment, at least part of the dilute salt stream being fed to the concentration compartment;
   withdrawing an electrodialysis product stream from the concentration compartment;
   combining the raw salt stream and the electrodialysis product stream to form the salt feed stream; and
   controlling the pH of the salt feed stream by controlling the relative flow rates of the salt feed stream and concentrated salt stream being combined and the operation of the water splitter.

19. The method of claim 17 wherein the water splitter further comprises an acid compartment, and a base compartment.

20. The method of claim 19 wherein the pH of the salt stream feed is from 2 to 6.9.

21. A method of converting salt in a raw stream to acid and base in a water splitter comprising a salt compartment, an acid compartment, and a base compartment comprising:
   feeding the salt feed stream to the salt compartment of the water splitter;
   withdrawing a dilute salt stream from the salt compartment;

withdrawing an acid stream from the acid compartment;

withdrawing a base stream from the base compartment;

feeding the dilute salt stream to an electrodialysis unit having a diluting compartment and a concentration compartment, at least part of the dilute salt solution being fed to the concentration compartment;

withdrawing an electrodialysis product stream from the concentration compartment; and controlling the pH of the salt feed stream by combining the salt feed stream with a stream selected from the group consisting of the acid stream, the base stream, and the dilute salt stream.

* * * * *